United States Patent
Fisher et al.

(10) Patent No.: US 9,996,224 B2
(45) Date of Patent: Jun. 12, 2018

(54) METHODS, SYSTEMS, AND MEDIA FOR CREATING AND UPDATING A GROUP OF MEDIA CONTENT ITEMS

(71) Applicant: Google LLC, Mountain View, CA (US)

(72) Inventors: Natalia Ann Cohen Fisher, San Francisco, CA (US); Garen Checkley, San Francisco, CA (US)

(73) Assignee: Google LLC, Mountain View, CA (US)

(*) Notice: Subject to any disclaimer, the term of this patent is extended or adjusted under 35 U.S.C. 154(b) by 157 days.

(21) Appl. No.: 15/056,372

(22) Filed: Feb. 29, 2016

(65) Prior Publication Data

US 2017/0249058 A1    Aug. 31, 2017

(51) Int. Cl.
*G06F 3/048* (2013.01)
*G06F 3/0482* (2013.01)
*G06F 3/0484* (2013.01)
*G06F 17/30* (2006.01)

(52) U.S. Cl.
CPC .......... *G06F 3/0482* (2013.01); *G06F 3/0484* (2013.01); *G06F 17/3002* (2013.01); *G06F 17/30997* (2013.01)

(58) Field of Classification Search
CPC ....................................................... G06F 3/048
See application file for complete search history.

(56) References Cited

U.S. PATENT DOCUMENTS

| 9,063,984 B1 | 6/2015 | Sandland et al. |
| 2013/0336590 A1* | 12/2013 | Sentinelli ............... H04N 5/772 382/218 |
| 2017/0011044 A1* | 1/2017 | Sandland ............ G06F 17/3053 |

OTHER PUBLICATIONS

International Search Report and Written Opinion dated Feb. 24, 2017 in International Patent Application No. PCT/US2016/065648.

* cited by examiner

*Primary Examiner* — Peiyong Weng
(74) *Attorney, Agent, or Firm* — Byrne Poh LLP

(57) ABSTRACT

Methods, systems, and media for identifying and updating a group of media content items are provided. In some embodiments, the method comprises: receiving indications of filtering criteria; identifying a first collection of media content items, wherein the first collection of media content items includes media content items associated with a particular topic; identifying a first group of candidate media content items, wherein the first group of candidate media content items includes media content items not included in the first collection of media content items; creating a second collection of media content items by applying the stored filtering criteria to the first collection of media content items and the first group of candidate media content items; and causing a user interface that indicates the second collection of media content items and the identifier of the collection of media content items to be presented.

21 Claims, 5 Drawing Sheets

METHODS, SYSTEMS, AND MEDIA FOR CREATING AND UPDATING A GROUP OF MEDIA CONTENT ITEMS

TECHNICAL FIELD

The disclosed subject matter relates to methods, systems, and media for creating and updating a group of media content items.

BACKGROUND

People often view media content, such as videos, movies, and television programs on user devices. Additionally, people are often interested in viewing media content related to particular topics and/or genres, such as news programs, documentaries, videos related to a particular topic or created by a particular group, etc. However, it can be difficult to identify media content items related to the topics or genres of interest, and it can be time-consuming to identify new media content items related to the topics or genres over time.

Accordingly, it is desirable to provide methods, systems, and media for creating and updating a group of media content items.

SUMMARY

Methods, systems, and media for creating and updating a group of media content items are provided. In accordance with some embodiments of the disclosed subject matter, methods for creating and updating a group of media content items are provided, the methods comprising: receiving, from a user device, one or more indications of filtering criteria to be applied to a corpus of media content items; storing the received indications of filtering criteria in connection with an identifier of a collection of media content items; receiving, from the user device, a first request to present the collection of media content items; in response to receiving the request, identifying a first collection of media content items, wherein the first collection of media content items includes a plurality of media content items associated with a particular topic; identifying a first group of candidate media content items, wherein the first group of candidate media content items includes media content items not included in the first collection of media content items; creating a second collection of media content items by applying the stored filtering criteria to the first collection of media content items and the first group of candidate media content items; causing a user interface that indicates the second collection of media content items and the identifier of the collection of media content items to be presented on the user device; receiving, from the user device, a second request to update the second collection of media content items; in response to receiving the second request, identifying a second group of candidate media content items from the one or more sources of media content; modifying the second collection of media content items by applying the stored filtering criteria to the second group of candidate media content items; updating the user interface by indicating the modified second collection of media content items; and causing the updated user interface to be presented on the user device.

In accordance with some embodiments of the disclosed subject matter, systems for creating and updating a group of media content items are provided, the systems comprising: a hardware processor that is programmed to: receive, from a user device, one or more indications of filtering criteria to be applied to a corpus of media content items; store the received indications of filtering criteria in connection with an identifier of a collection of media content items; receive, from the user device, a first request to present the collection of media content items; in response to receiving the request, identify a first collection of media content items, wherein the first collection of media content items includes a plurality of media content items associated with a particular topic; identify a first group of candidate media content items, wherein the first group of candidate media content items includes media content items not included in the first collection of media content items; create a second collection of media content items by applying the stored filtering criteria to the first collection of media content items and the first group of candidate media content items; cause a user interface that indicates the second collection of media content items and the identifier of the collection of media content items to be presented on the user device; receive, from the user device, a second request to update the second collection of media content items; in response to receiving the second request, identify a second group of candidate media content items from the one or more sources of media content; modify the second collection of media content items by applying the stored filtering criteria to the second group of candidate media content items; update the user interface by indicating the modified second collection of media content items; and cause the updated user interface to be presented on the user device.

In accordance with some embodiments of the disclosed subject matter, non-transitory computer-readable media containing computer executable instructions that, when executed by a processor, cause the processor to perform a method for creating and updating a group of media content items. The method comprises: receiving, from a user device, one or more indications of filtering criteria to be applied to a corpus of media content items; storing the received indications of filtering criteria in connection with an identifier of a collection of media content items; receiving, from the user device, a first request to present the collection of media content items; in response to receiving the request, identifying a first collection of media content items, wherein the first collection of media content items includes a plurality of media content items associated with a particular topic; identifying a first group of candidate media content items, wherein the first group of candidate media content items includes media content items not included in the first collection of media content items; creating a second collection of media content items by applying the stored filtering criteria to the first collection of media content items and the first group of candidate media content items; causing a user interface that indicates the second collection of media content items and the identifier of the collection of media content items to be presented on the user device; receiving, from the user device, a second request to update the second collection of media content items; in response to receiving the second request, identifying a second group of candidate media content items from the one or more sources of media content; modifying the second collection of media content items by applying the stored filtering criteria to the second group of candidate media content items; updating the user interface by indicating the modified second collection of media content items; and causing the updated user interface to be presented on the user device.

In accordance with some embodiments of the disclosed subject matter, a system for creating and updating a group of media content items is provided, the system comprising: means for receiving, from a user device, one or more indications of filtering criteria to be applied to a corpus of media content items; means for storing the received indications of filtering criteria in connection with an identifier of a collection of media content items; means for receiving, from the user device, a first request to present the collection of media content items; in response to receiving the request, means for identifying a first collection of media content items, wherein the first collection of media content items includes a plurality of media content items associated with a particular topic; means for identifying a first group of candidate media content items, wherein the first group of candidate media content items includes media content items not included in the first collection of media content items; means for creating a second collection of media content items by applying the stored filtering criteria to the first collection of media content items and the first group of candidate media content items; means for causing a user interface that indicates the second collection of media content items and the identifier of the collection of media content items to be presented on the user device; means for receiving, from the user device, a second request to update the second collection of media content items; in response to receiving the second request, means for identifying a second group of candidate media content items from the one or more sources of media content; means for modifying the second collection of media content items by applying the stored filtering criteria to the second group of candidate media content items; means for updating the user interface by indicating the modified second collection of media content items; and means for causing the updated user interface to be presented on the user device.

In some embodiments, the filtering criteria include one or more keywords indicating a topic of the media content in the group of media content items.

In some embodiments, the filtering criteria include an indication that second collection of media content items are to be ranked based on a time at which each media content item in the first collection of candidate media content items and the first group of candidate media content items was created.

In some embodiments, the means for creating the second collection of media content items comprises: means for identifying a media content item that is included a plurality of times in the first group of candidate media content items; and means for removing duplicate versions of the media content item from the first group of candidate media content items.

In some embodiments, the means for creating the second collection of media content items comprises: means for identifying a media content item that has previously been presented on the user device; and means for removing the media content item from the first group of candidate media content items.

In some embodiments, the filtering criteria include an indication of a time period after which the group of media content items is to be updated, wherein the second group of candidate media content items is identified in response to determining that the time period has elapsed.

In some embodiments, the means for updating the user interface further comprises means for presenting an indication of a time at which the second collection of media content items was modified.

In accordance with some embodiments of the disclosed subject matter, methods for identifying and updating a group of media content items are provided, the methods comprising: receiving, from a user device, one or more indications of a first group of filtering criteria and one or more indications of a second group of filtering criteria to be applied to a corpus of media content items; storing the one or more indications of the first group of filtering criteria in connection with a first identifier of a first group of media content items and the one or more indications of the second group of filtering criteria in connection with a second identifier of a second group of media content items, wherein the first group of media content items includes media content related to a first topic and the second group of media content items includes media content related to a second topic; receiving, from the user device, a first request to present the first group of media content items; in response to receiving the first request, identifying a first group of candidate media content items from one or more sources of media content; creating a first ranked subset of the first group of candidate media content items by applying the stored first group of filtering criteria to the first group of candidate media content items; causing a first user interface that indicates the first ranked subset of the first group of candidate media content items and the first identifier of the first group of media content items to be presented on the user device; receiving, from the user device, a second request to present the second group of media content items; in response to receiving the second request, identifying a second group of candidate media content items from the one or more sources of media content; creating a second ranked subset of the second group of candidate media content items by applying the stored second group of filtering criteria to the second group of candidate media content items; and causing a second user interface that indicates the second ranked subset of the second group of candidate media content items to be presented on the user device.

In accordance with some embodiments of the disclosed subject matter, systems for identifying and updating a group of media content items are provided, the systems comprising: a hardware processor that is programmed to: receive, from a user device, one or more indications of a first group of filtering criteria and one or more indications of a second group of filtering criteria to be applied to a corpus of media content items; store the one or more indications of the first group of filtering criteria in connection with a first identifier of a first group of media content items and the one or more indications of the second group of filtering criteria in connection with a second identifier of a second group of media content items, wherein the first group of media content items includes media content related to a first topic and the second group of media content items includes media content related to a second topic; receive, from the user device, a first request to present the first group of media content items; in response to receiving the first request, identify a first group of candidate media content items from one or more sources of media content; create a first ranked subset of the first group of candidate media content items by applying the stored first group of filtering criteria to the first group of candidate media content items; cause a first user interface that indicates the first ranked subset of the first group of candidate media content items and the first identifier of the first group of media content items to be presented on the user device; receive, from the user device, a second request to present the second group of media content items; in response to receiving the second request, identify a second group of candidate media content items from the one or more sources of media content; create a second ranked subset of the second group of candidate media content items by applying the stored second group of filtering criteria to the second group of candidate media content items; and cause a second user interface that indicates the second ranked subset of the second group of candidate media content items to be presented on the user device.

In accordance with some embodiments of the disclosed subject matter, non-transitory, computer-readable media containing computer executable instructions that, when executed by a processor, cause the processor to perform a method for identifying and updating a group of media content items are provided. The method comprises: receiving, from a user device, one or more indications of a first group of filtering criteria and one or more indications of a second group of filtering criteria to be applied to a corpus of media content items; storing the one or more indications of the first group of filtering criteria in connection with a first identifier of a first group of media content items and the one or more indications of the second group of filtering criteria in connection with a second identifier of a second group of media content items, wherein the first group of media content items includes media content related to a first topic and the second group of media content items includes media content related to a second topic; receiving, from the user device, a first request to present the first group of media content items; in response to receiving the first request, identifying a first group of candidate media content items from one or more sources of media content; creating a first ranked subset of the first group of candidate media content items by applying the stored first group of filtering criteria to the first group of candidate media content items; causing a first user interface that indicates the first ranked subset of the first group of candidate media content items and the first identifier of the first group of media content items to be presented on the user device; receiving, from the user device, a second request to present the second group of media content items; in response to receiving the second request, identifying a second group of candidate media content items from the one or more sources of media content; creating a second ranked subset of the second group of candidate media content items by applying the stored second group of filtering criteria to the second group of candidate media content items; and causing a second user interface that indicates the second ranked subset of the second group of candidate media content items to be presented on the user device.

In accordance with some embodiments of the disclosed subject matter, a system for identifying and updating a group of media content items is provided, the system comprising: means for receiving, from a user device, one or more indications of a first group of filtering criteria and one or more indications of a second group of filtering criteria to be applied to a corpus of media content items; means for storing the one or more indications of the first group of filtering criteria in connection with a first identifier of a first group of media content items and the one or more indications of the second group of filtering criteria in connection with a second identifier of a second group of media content items, wherein the first group of media content items includes media content related to a first topic and the second group of media content items includes media content related to a second topic; means for receiving, from the user device, a first request to present the first group of media content items; in response to receiving the first request, means for identifying a first group of candidate media content items from one or more sources of media content; means for creating a first ranked subset of the first group of candidate media content items by applying the stored first group of filtering criteria to the first group of candidate media content items; means for causing a first user interface that indicates the first ranked subset of the first group of candidate media content items and the first identifier of the first group of media content items to be presented on the user device; means for receiving, from the user device, a second request to present the second group of media content items; in response to receiving the second request, means for identifying a second group of candidate media content items from the one or more sources of media content; means for creating a second ranked subset of the second group of candidate media content items by applying the stored second group of filtering criteria to the second group of candidate media content items; and means for causing a second user interface that indicates the second ranked subset of the second group of candidate media content items to be presented on the user device.

In some embodiments, the first group of filtering criteria include one or more keywords indicating the first topic.

In some embodiments, the first group of filtering criteria include an indication that the first ranked subset of the first group of candidate media content items is to be ranked based on a time at which each media content item in the first group of candidate media content items was created.

In some embodiments, the means for creating the first ranked subset of the first group of candidate media content items further comprises: means for identifying a media content item that is included a plurality of times in the first group of candidate media content items; and means for removing duplicated versions of the media content item from the first group of candidate media content items.

In some embodiments, the means for creating the first ranked subset of the first group of media content items further comprises: means for identifying a media content item that has previously been presented on the user device; and means for removing the media content item from the first group of candidate media content items.

In some embodiments, the system further comprises: means for receiving, from the user device, a third request to update the first group of media content items; in response to receiving the third request, means for identifying a third group of media content items from the one or more sources of media content; means for creating a third ranked subset of the third group of candidate media content items by applying the stored first group of filtering criteria to the third group of candidate media content items; means for updating the first user interface with the third ranked subset of the third group of candidate media content items; and means for causing the updated first user interface to be presented on the user device.

In some embodiments, the means for updating the first user interface further comprises means for presenting an indication of a time at which the third ranked subset of the third group of candidate media content items was created.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
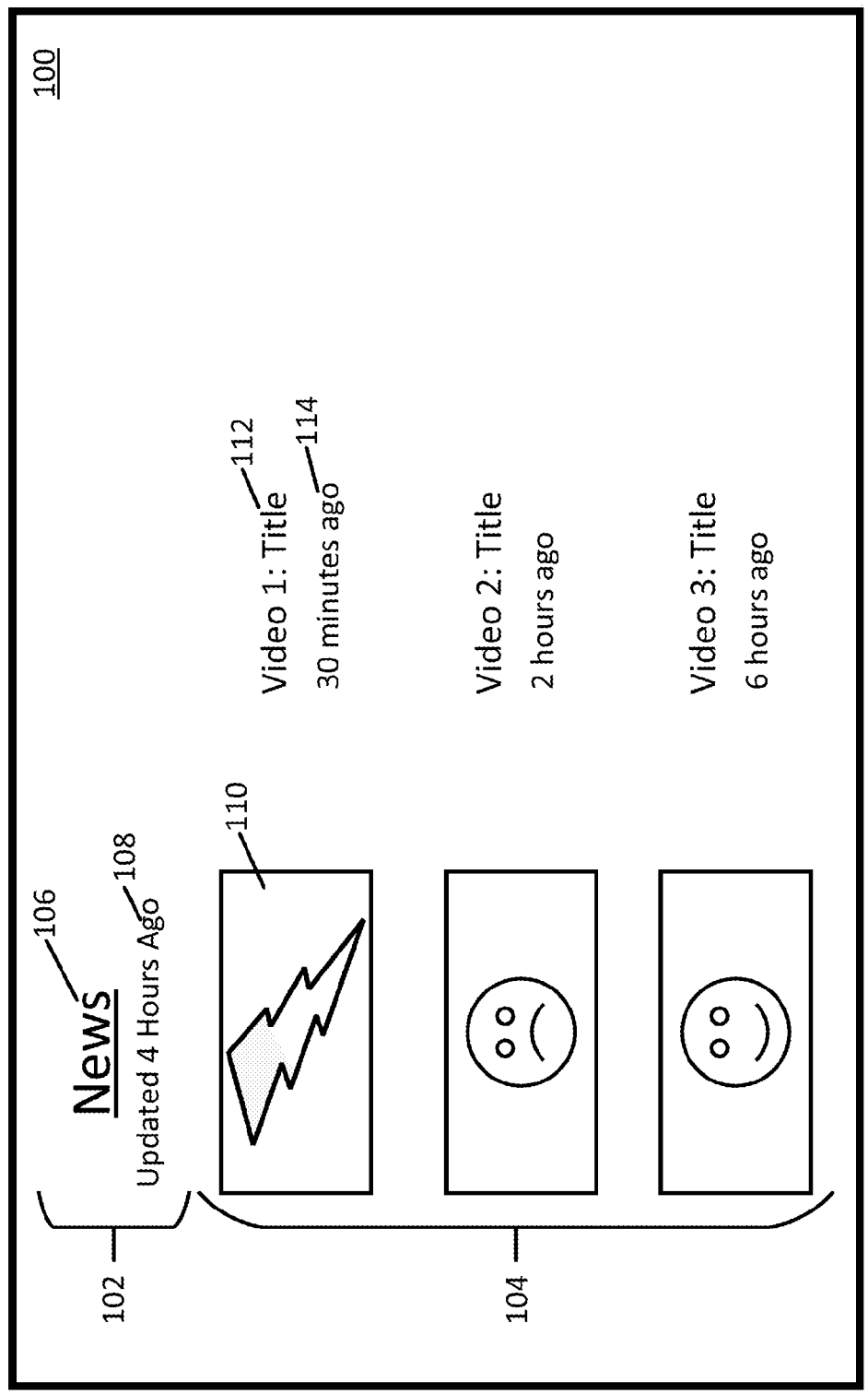
FIG. 1 shows an example of a user interface for presenting a group of media content items in accordance with some embodiments of the disclosed subject matter.

In accordance with various embodiments, mechanisms (which can include methods, systems, and media) for creating and updating a group of media content items are provided.

In accordance with some embodiments of the disclosed subject matter, the mechanisms described herein can create and update a group of media content items and cause indications of the group of media content items to be presented on a user device. In some embodiments, the group of media content items can be associated with any suitable theme and/or genre (e.g., news, documentaries, music videos, related to a particular topic, and/or associated with any other suitable theme and/or genre), and the group of media content items can be presented with a title that indicates the theme and/or genre.

In some embodiments, the mechanisms can receive, from the user device, filtering criteria that can be applied during creation of the group of media content items. For example, as described below in connection with FIGS. 4 and 5, the filtering criteria can indicate how recently the media content items were created, keywords associated with the media content items, durations of the media content items, and/or any other suitable types of criteria. The mechanisms can identify a group of candidate media content items, and can then apply the filtering criteria to the group of candidate media content items to create a ranked subset of the group of candidate media content items. The mechanisms described herein can then cause indications of the ranked subset of media content items to be presented in a user interface on the user device. In some embodiments, the filtering criteria can be used to update the group of media content items, for example, when an updated listing of the group of content items is requested by a user of the user device or at any suitable frequency (e.g., every hour, every day, and/or any other suitable frequency). Note that, in some embodiments, the mechanisms can cause indications of the ranked subset of media content to be presented on a user device other than the user device that provided the filtering criteria.

In some embodiments, the filtering criteria can be used to modify and/or update a collection of media content items collated by any suitable entity (e.g., a video sharing service, a channel associated with a video sharing service, a group on a social networking service, another user, and/or any other suitable entity). For example, in some embodiments, a first entity can create a collection of media content items corresponding to any suitable genre and/or theme. As a more particular example, the collection of media content items can include collections such as "Top 10 Recent News Videos," "Most Popular Music Videos," a collection of media content items corresponding to a particular band, a collection of media content items associated with a particular topic, and/or any other suitable genre, topic, and/or theme. Continuing with this example, in some embodiments, the mechanisms can receive, from a second entity (e.g., a user of a user device, a group on social networking service, and/or any other suitable entity) the filtering criteria, and the mechanisms can then use the filtering criteria to filter and/or refine the existing collection of media content items. As a more particular example, in instances where the filtering criteria indicate timing information, the filtering criteria can be used to remove content items and/or rank content items included in the collection of media content items based on the timing information (e.g., remove items that were created before a particular time, rank items created before a particular time lower, and/or remove and/or rank the media content items in any other suitable manner). As another more particular example, in instances where the filtering criteria indicate keyword information, the filtering criteria can be used to remove content items and/or rank content items included in the collection of media content items based on the keyword(s). In some embodiments, the filtering criteria can include any other suitable information, such as a source of the media content items, and/or any other suitable information. As a specific example, if the collection of media content items includes media content related to news, the filtering criteria can be used to refine the collection of media content items to remove media content items related to particular keywords and/or topics (e.g., related to a particular current event, related to a particular person, and/or any other suitable topic), remove media content items produced by and/or associated with a particular source (e.g., a particular online publication, a particular television channel, and/or any other suitable source), remove media content items created prior to a particular date and/or time, and/or remove any other suitable media content items. Note that, in some embodiments, the filtering criteria can be used to change a rank of the media content items, for example, to present them more or less prominently within the group of media content items.

In some embodiments, the group of candidate media content items can be identified from any suitable source and/or corpus of media content. For example, in some embodiments, the mechanisms described herein can identify the group of media content items from forums on social networking sites on which media content has been shared and/or posted, one or more playlists of media content items, by identifying media content related to other media content that has been viewed and/or enjoyed by a user of the user device, and/or from any other suitable sources.

Turning to FIG. 1, an example 100 of a user interface for presenting a group of media content items is shown in accordance with some embodiments of the disclosed subject matter. As illustrated, user interface 100 can include group information 102 and a group of media content items 104.

In some embodiments, group information 102 can include a group title 106 and a time indicator 108. Group title 106 can be any suitable title indicating content of group of media content items 104. For example, as shown in FIG. 1, group title 106 can indicate a genre of media content included in group of media content items 104. In some embodiments, group title 106 can be specified by a user, as described below in connection with FIGS. 4 and 5. In some embodiments, group title 106 can include any suitable text, images, icons, graphics, animations, hyperlinks, and/or any other suitable text. In some embodiments, group title 106 can be omitted. Additionally or alternatively, in some embodiments, group information 102 can include a subtitle. Time indicator 108 can be any suitable indicator of a date and/or time at which group of media content items 104 was generated and/or updated. In some embodiments, time indicator 108 can be omitted.

Note that, although group information 102 is shown as having a title and a time indicator, in some embodiments, any other suitable pieces of information can be included.

Group of media content items 104 can include any suitable number (e.g., one, two, four, ten, twenty, and/or any other suitable number) of media content items. In some embodiments, media content items in group of media content items 104 can be identified using any suitable information and/or techniques. For example, as described below in connection with FIGS. 4 and 5, a group of candidate media content items can be identified from multiple sources (e.g., social networking forums, a playlist of media content items, and/or any other suitable sources), and a subset of the group of candidate media content items can be identified based on filtering criteria specified by a user associated with a user device that is presenting user interface 100.

In some embodiments, an individual media content item in group of media content items 104 can include an image 110, a title 112, and a time indicator 114. In some embodiments, image 110 can be any suitable image associated with the media content item (e.g., a screen capture from a video, an image associated with a creator of the media content item, and/or any other suitable image). Title 112 can be any suitable title associated with the media content item, and can include any suitable text, icons, graphics, hyperlinks, and/or any other suitable content. Time indicator 114 can indicate a time at which the media content item was created and/or uploaded (e.g., to a media content sharing site). Note that, in some embodiments, any other suitable information (e.g., a name of a creator of a media content item, a number of views associated with a media content item, a duration of a media content item, and/or any other suitable information) can be included with each media content item in group of media content items 104. Additionally, in some embodiments, any of image 110, title 112, and/or time indicator 114 can be omitted from one or more media content items in group of media content items 104.

Figure 2:
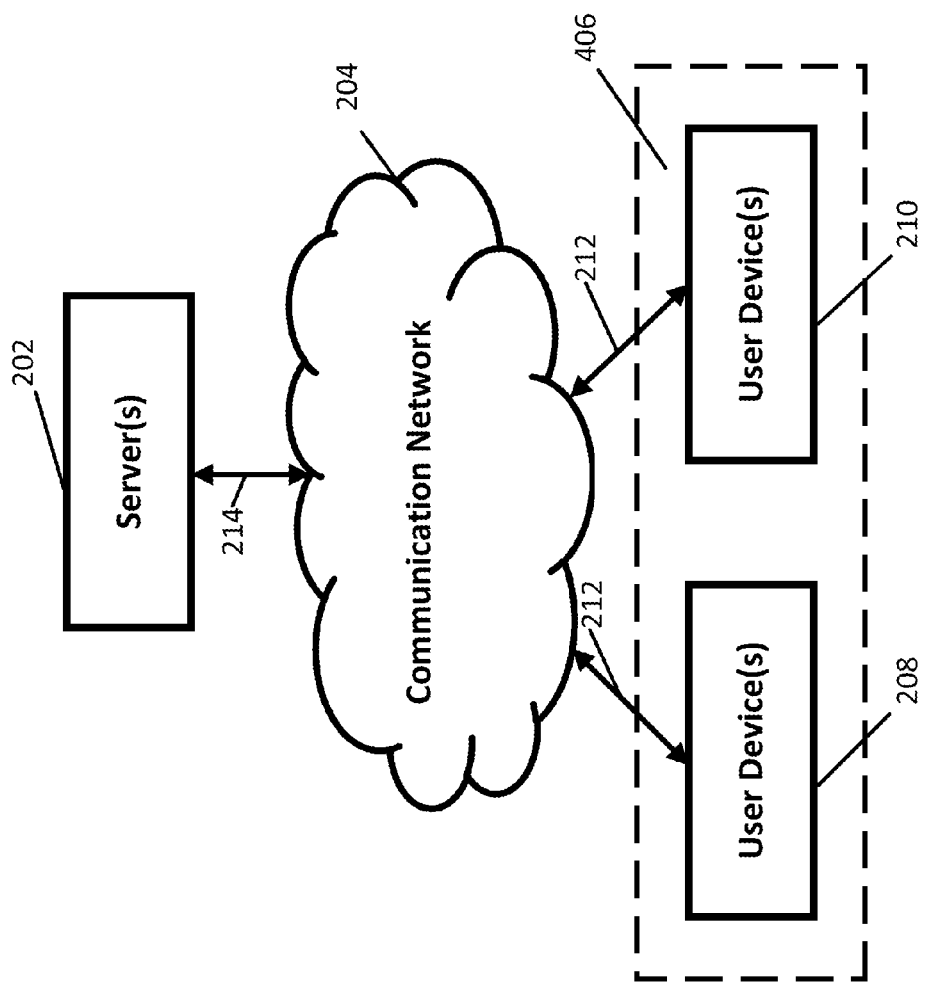
FIG. 2 shows a schematic diagram of an illustrative system suitable for implementation of mechanisms described herein for updating a group of media content items in accordance with some embodiments of the disclosed subject matter.

Turning to FIG. 2, an example 200 of hardware for creating and updating a group of media content items that can be used in accordance with some embodiments of the disclosed subject matter is shown. As illustrated, hardware 200 can include one or more servers such as server(s) 202, a communication network 204, and/or one or more user devices 206, such as user devices 208 and 210.

In some embodiments, server(s) 202 can be any suitable server for creating and/or updating a group of media content items and causing a user interface indicating the group of media content items to be presented on user device 206. For example, in some embodiments, server(s) 202 can receive filtering criteria from user device 206 and can create the group of media content items based on the filtering criteria, as described below in connection with FIGS. 4 and 5. In some embodiments, server(s) 202 can store existing collections of media content items, which can be modified and/or updated based on the filtering criteria received from user device 206. For example, in some embodiments, server(s) 202 can store and maintain collections of media content items such as "Top 10 Music Videos," "Top 10 News Segments," "Most Popular Documentaries," and/or any other suitable groups of media content items.

Communication network 204 can be any suitable combination of one or more wired and/or wireless networks in some embodiments. For example, communication network 204 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 206 can be connected by one or more communications links 212 to communication network 204 that can be linked via one or more communications links (e.g., communications link 214) to server(s) 202. Communications links 212 and/or 214 can be any communications links suitable for communicating data among user devices 206 and server(s) 202 such as network links, dial-up links, wireless links, hard-wired links, any other suitable communications links, or any suitable combination of such links.

In some embodiments, user devices 206 can include one or more computing devices suitable for requesting a group of media content items, viewing a media content item, and/or any other suitable functions. For example, in some embodiments, user devices 206 can be implemented as a mobile device, such as a smartphone, mobile phone, a tablet computer, a laptop computer, a vehicle (e.g., a car, a boat, an airplane, or any other suitable vehicle) entertainment system, a portable media player, and/or any other suitable mobile device. As another example, in some embodiments, user devices 206 can be implemented as a non-mobile device such as a desktop computer, a set-top box, a television, a streaming media player, a game console, and/or any other suitable non-mobile device.

Although server(s) 202 is illustrated as one device, the functions performed by server(s) 202 can be performed using any suitable number of devices in some embodiments. For example, in some embodiments, multiple devices can be used to implement the functions performed by server(s) 202.

Although two user devices 208 and 210 are shown in FIG. 2, any suitable number of user devices, and/or any suitable types of user devices, can be used in some embodiments.

Figure 3:
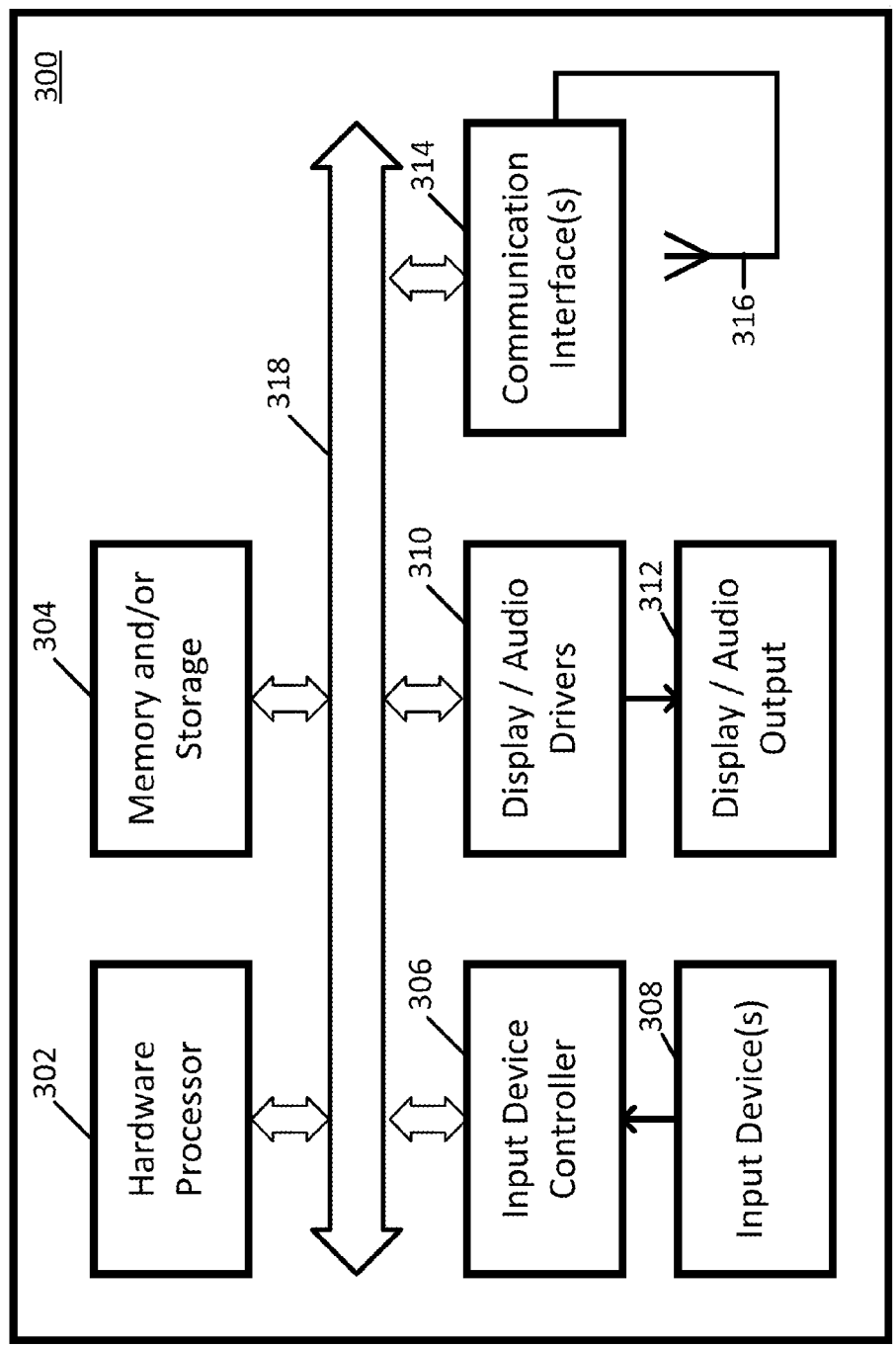
FIG. 3 shows a detailed example of hardware that can be used in a server and/or a user device of FIG. 2 in accordance with some embodiments of the disclosed subject matter.

Server(s) 202 and user device 206 can be implemented using any suitable hardware in some embodiments. For example, in some embodiments, devices 202 and 206 can be implemented using any suitable general purpose computer or special purpose computer. For example, a server may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 302 can be controlled by a server program stored in memory and/or storage 304 of a server (e.g., such as server(s) 202). For example, the server program can cause hardware processor 302 to create a group of media content items, transmit a user interface indicating the group of media content items to user device 206, and/or perform any other suitable actions. In some embodiments, hardware processor 302 can be controlled by a computer program stored in memory and/or storage 304 of user device 206. For example, the computer program can cause hardware processor 302 to receive indications of filtering criteria, request a group of media content items, present a user interface indicating a group of media content items, and/or perform any other suitable actions.

Memory and/or storage 304 can be any suitable memory and/or storage for storing programs, data, media content, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks, such as network 204 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 204) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 300 in accordance with some embodiments.

Figure 4:
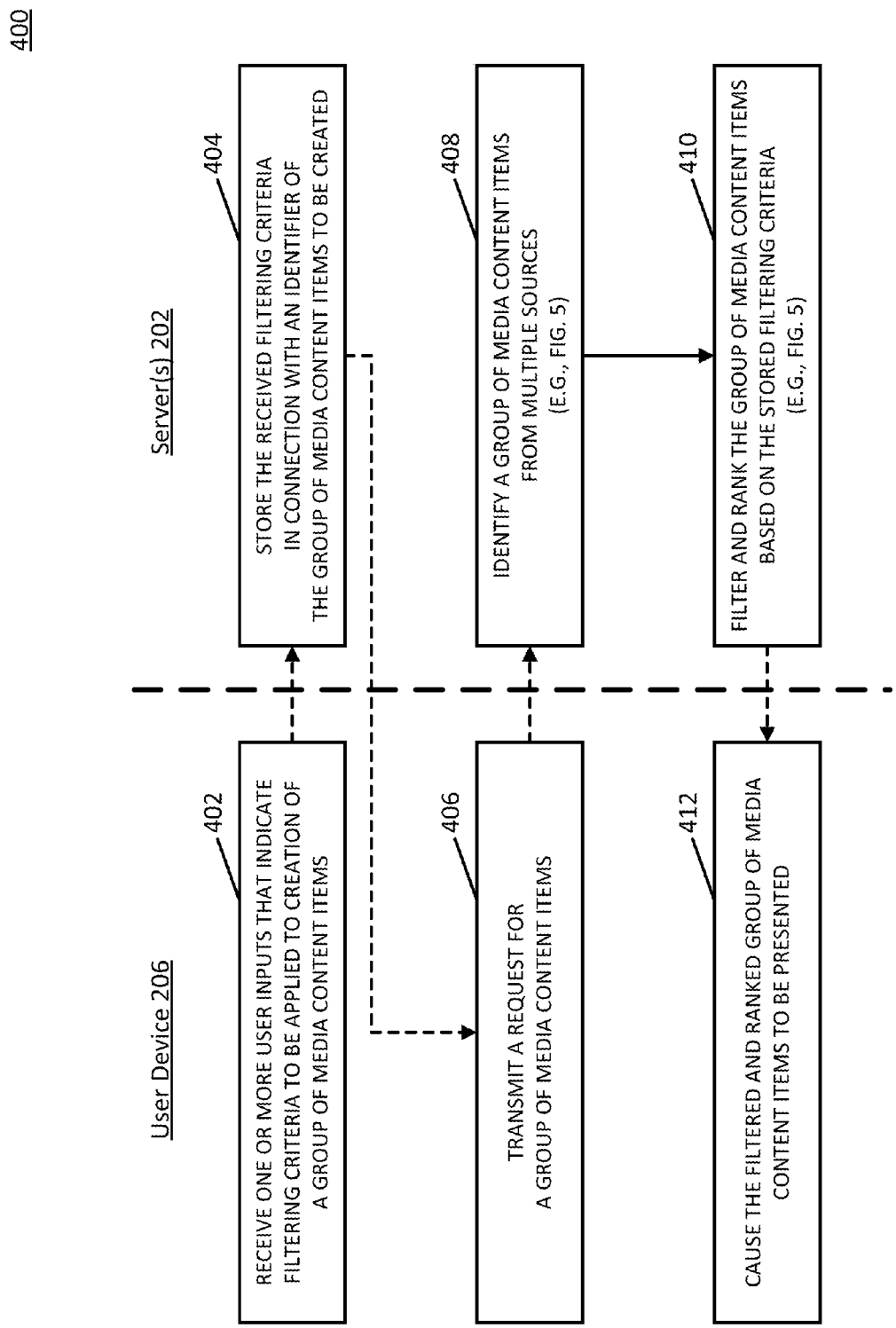
FIG. 4 shows an example of an information flow diagram for creating a group of media content items.

Turning to FIG. 4, an example 400 of an information flow diagram is shown in accordance with some embodiments of the disclosed subject matter. As illustrated, blocks of information flow diagram 400 can be executed on user device 206 and/or on server(s) 202.

User device 206 can begin by receiving one or more user inputs that indicate filtering criteria to be applied in creation of a group of media content items at 402. In some embodiments, the filtering criteria can relate to any suitable types of information. For example, in some embodiments, the filtering criteria can relate to timing information associated with the media content items. As a more particular example, in some embodiments, the filtering criteria can indicate that only media content items that were created within a particular time period (e.g., within the last day, within the last week, within the last year, and/or any other suitable time period) are to be presented. As another more particular example, in some embodiments, the filtering criteria can indicate that only media content items of a particular duration (e.g., less than a particular duration long, more than a particular duration long, and/or any other suitable criteria) are to be presented.

As another example, in some embodiments, the filtering criteria can relate to topics of the media content items. As a more particular example, in some embodiments, the filtering criteria can include one or more keywords, and the keywords can be used to identify media content items related to the one or more keywords (e.g., based on metadata associated with the identified media content items).

As yet another example, in some embodiments, the filtering criteria can relate to a manner in which the group of media content items is to be created and/or presented. As a more particular example, in some embodiments, the filtering criteria can indicate an order in which media content items are to be sorted for presentation. As a specific example, the order can be determined based on recency of the media content items (e.g., how recently the media content item was created), popularity of the media content items (e.g., based on a number of views, a number of comments, and/or any other suitable popularity metric), based on a random shuffle, and/or in any other suitable manner. As another more particular example, in some embodiments, the filtering criteria can indicate that media content that has been identified more than once (e.g., with different titles, from different sources, and/or duplicated in any other suitable manner) is to not be included in the group of media content items. Additionally, in some embodiments, the filtering criteria can indicate that media content items that have already been presented on user device 206 are not to be included in the group of media content items. Note that, in some embodiments, media content items that have been presented on other user devices that are associated with a user account that has been authenticated on user device 206 can be removed from the group of media content items. As yet another more particular example, in some embodiments, the filtering criteria can indicate a frequency with which the group of media content items is to be updated (e.g., once an hour, once a day, and/or any other suitable frequency).

At 404, server(s) 202 can store the received filtering criteria in connection with an identifier of the group of media content items to be created. The received filtering criteria can be stored in any suitable manner. For example, in some embodiments, the filtering criteria can be stored in a database in memory 304 of server(s) 202. In some such embodiments, the identifier of the group of media content items to be created can be used as a key to access the corresponding filtering criteria. As a more particular example, in some embodiments, the identifier can indicate a user account associated with the group of media content items to be created, a genre associated with the group of media content items, and/or any other suitable information. Note that, in some embodiments, a particular user account can be associated with multiple identifiers. For example, in some such embodiments, multiple groups of content items can be created (e.g., each corresponding to a different genre and/or topic of media content), and each group can be associated with an identifier.

At 406, user device 206 can transmit a request for a group of media content items. The request can be identified and transmitted based on any suitable action. For example, in some embodiments, the request can be identified and transmitted based on a user of user device 206 navigating to a page for presenting the group of media content items. As another example, in some embodiments, the request can be identified and transmitted based on a user of user device 206 requesting that a page for presenting the group of media content items be updated.

At 408, server(s) 202 can identify a group of candidate media content items from multiple sources. The sources of media content can include any suitable corpus of media content. For example, in some embodiments, the sources of media content can include one or more videos uploaded to a video sharing site. As a more particular example, in some embodiments, the video can be uploaded in connection with particular channels of media content on the video sharing site and/or can be indicated as belonging to particular genres of media content. As another example, in some embodiments, the sources of media content can include a group of media content identified as being related to a particular item of media content. As a more particular example, in some embodiments, an item of media content that has been determined to be enjoyed and/or of interest to a user associated with user device 202 can be identified, and one or more related items of media content can be identified using any suitable technique(s) (e.g., based on metadata associated with each of the media content items, and/or using any other suitable techniques). As yet another example, in some embodiments, the sources of media content can include media content items posted on a forum in a social networking site. As a more particular example, in some embodiments, the forum can be one in which a user of user device 202 has previously visited, commented in, posted in, and/or expressed interest in in any suitable manner. As still another example, in some embodiments, the sources of media content can include one or more playlists of media content. As a more particular example, in some embodiments, a playlist can be one created by a user of user device 202, one created by a social networking connection of the user of user device 202, and/or created by any other suitable user.

Note that, in some embodiments, the group of media content items can include an existing collection and/or playlist aggregated by any suitable entity. For example, as described above, the group of media content items can include a collection of most popular media content items related to a particular topic and/or genre (e.g., "Top 10 News Videos," "Most Popular Documentaries," a collection of media content items associated with a particular band, and/or any other suitable collection of media content). In some embodiments, the filtering criteria can be used the further modify the collection of media content items (e.g., by removing media content items older than a particular date, by removing media content items associated with a particular content source, and/or based on any other suitable criteria), and/or to rank the content items (e.g., to more or less prominently present content based on date of creation, content source, topic, and/or any other suitable criteria).

At 410, server(s) 202 can filter and rank the group of candidate media content items using the stored filtering criteria. In some embodiments, applying the filtering criteria to the group of candidate media content items can cause media content items to be removed from the group of candidate media content items. For example, in instances where the filtering criteria indicate that media content items that have already been viewed are not to be presented in the group of media content items, items that have already been watched by a user of user device 202 can be removed. Additionally or alternatively, the filtering criteria can cause media content items in the group of candidate media content items to be ranked in any suitable manner. A process for applying the filtering criteria to the group of candidate media content items is described below in detail in connection with block 510 of FIG. 5. Note that, in some embodiments, the filtering criteria can be provided by multiple user devices. For example, in some embodiments, multiple users of multiple user devices can each provide different filtering criteria, which can be used to collaboratively create the filtered and ranked group of media content items. In some embodiments, the multiple users can be connected to each other in any suitable manner (e.g., connected in a social network, belong to the same group in a social network, subscribed to the same channel of content in a content sharing service, and/or connected in any other suitable manner).

At 412, user device 206 can cause the filtered and ranked group of media content items to be presented. The filtered and ranked group of media content items can be presented in any suitable manner. For example, as shown in FIG. 1, in some embodiments, the group of media content items can be presented in a user interface with an indication of a title of the group of media content items and a time at which the media content items was last updated. As another example, as shown in FIG. 1, each item in the group of media content items can be presented with any suitable information, such as an image associated with the media content item, a title of the media content item, a date indicating a time of creation of the media content item, and/or any other suitable information.

Note that, in some embodiments, the filtered and ranked group of media content items can be presented on a user device other than the user device that provided the filtering criteria at block 402. For example, in some embodiments, a user of a second user device can request a user interface indicating the filtered and ranked group of media content items created using filtering criteria provided by a first user device. In some embodiments, the user of the second user device can be connected to a user of the first user device in any suitable manner (e.g., connected in a social network, belong to the same group in a social network, subscribed to the same channel of content in a content sharing service, and/or connected in any other suitable manner). In some such embodiments, a user of the second user device can be presented with an indication that a user of the first user device has collated a group of media content items using the filtering criteria in any suitable manner.

Note that, in some embodiments, blocks 406-412 can be performed and/or repeated at any suitable times or frequencies. For example, in some embodiments, blocks 406-412 can be repeated in response to receiving a request from user device 206 that the group of media content items is to be updated (e.g., to include newly created media content items, and/or to include any other suitable media content items). As another example, in some embodiments, blocks 406-412 can be repeated at a predetermined frequency (e.g., once every hour, and/or any other suitable frequency). In some such embodiments, the predetermined frequency can be indicated in the filtering criteria received from user device 206. In some embodiments, the stored filtering criteria received at block 404 by server(s) 202 can be used to update the group of media content items.

Figure 5:
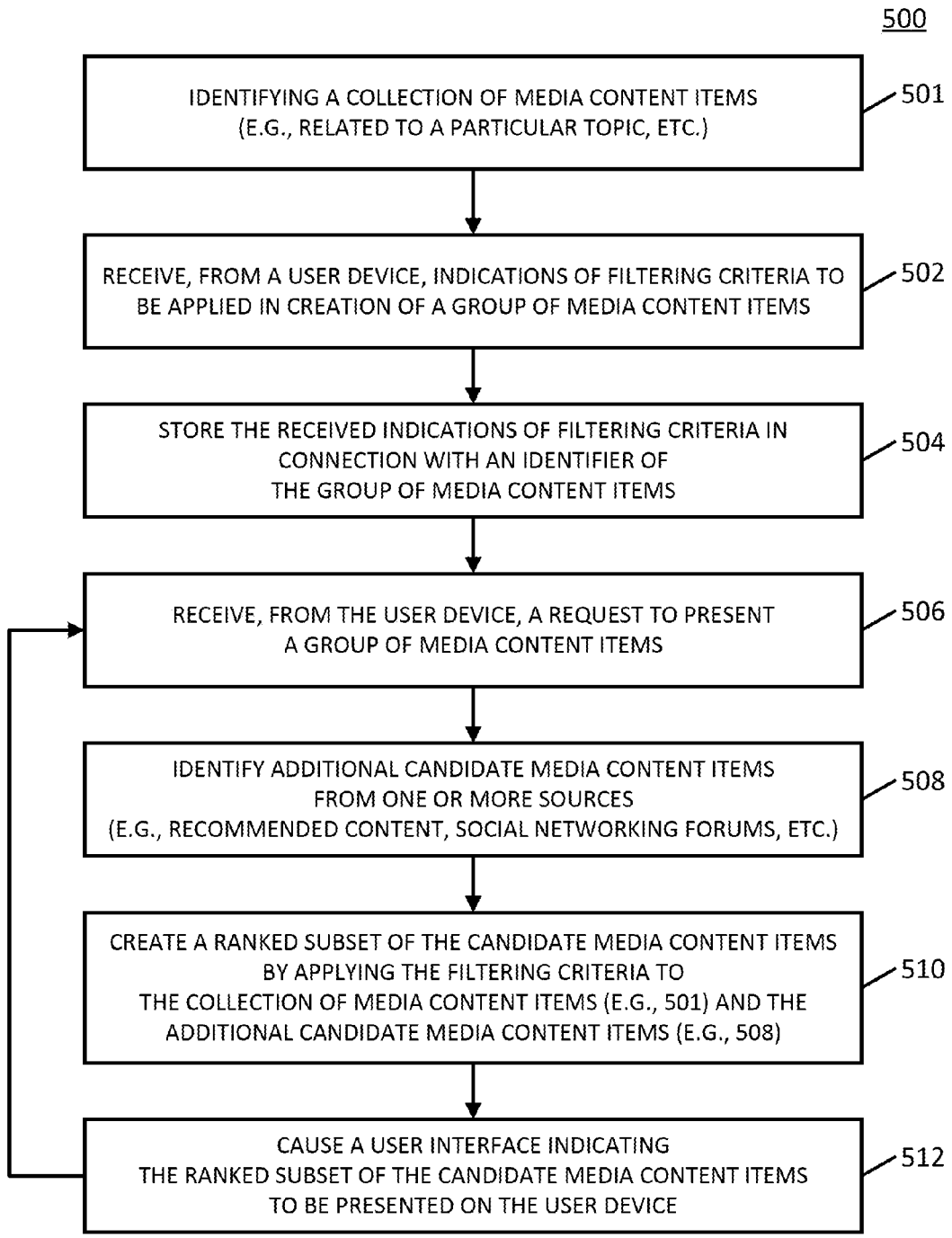
FIG. 5 shows an example of a process for creating and updating a group of media content items.

Turning to FIG. 5, an example 500 of a process for identifying and ranking a group of content items is presented in accordance with some embodiments of the disclosed subject matter.

Process 500 can begin by identifying an existing collection of media content items at 501. For example, in some embodiments, the collection of media content items can include one or more media content items that are related in any suitable manner. As a more particular example, the collection of media content items can all relate to the same topic, created by the same entity, shared on the same group of a social networking service, belong to the same genre (e.g., news, documentaries, music videos, television programs, radio programs, and/or any other suitable genre), and/or be related in any other suitable manner. As a specific example, in some embodiments, the collection of media content items can be the top N (e.g., most popular, most watched, most watched within a particular time period, most popular with a particular group of users, and/or identified based on any other suitable metric) media content items relating to a particular topic. In some embodiments, process 500 can identify the collection of media content items using any suitable technique(s). For example, in some embodiments, process 500 can identify collections of media content items that are stored on one of server(s) 202 based on metadata (e.g., titles, keywords, names of creators, and/or any other suitable metadata) associated with each collection.

Process 500 can receive, from a user device, indications of filtering criteria to be applied during creation of and/or modification of a group of media content items at 502. As described above in connection with block 402 of FIG. 4, the filtering criteria can include any suitable criteria, such as indicating how recently a media content item was created, a duration of a media content item, a topic of the media content item, and/or any other suitable filtering criteria. Note that, in some embodiments, process 500 can additionally receive a title for the group of media content items from the user device.

Note that, in some embodiments, process 500 can create the group of media content items by identifying a corpus of media content from any suitable sources (e.g., as described below in connection with block 508) and applying the filtering criteria to the identified media content item. Additionally or alternatively, in some embodiments, process 500 can refine an existing collection of media content (e.g., a collection identified as described above in connection with block 501). For example, in instances where a collection of media content relates to a particular topic, the filtering criteria can be used to remove content items associated with a particular keyword, created before a particular date, associated with a particular content source, and/or based on any other suitable criteria, to thereby create a modified collection of content items based on the filtering criteria. Additional techniques for removing content items from a collection of media content and/or ranking content items included in a collection of media content are described below in connection with block 510.

Process 500 can store the received filtering criteria in connection with an identifier of the group of media content items at 504. In some embodiments, the identifier can correspond to the user device from which the filtering criteria were received. Additionally, in some embodiments, a user device can be associated with multiple groups of media content items (e.g., each group relating to a different topic and/or genre of content), and each group can be associated with a different identifier. As described above in connection with block 404 of FIG. 4, process 500 can store the filtering criteria in any suitable manner, for example, in a database stored in memory 304 of server(s) 202.

Process 500 can receive, from the user device, a request to present a group of media content items at 506. As described above in connection with block 406 of FIG. 4, the request can be based on any suitable information. For example, in some embodiments, the request can be transmitted based on information indicating that a user of the user device has navigated to a page for presenting the group of media content items, that a user of the user device has requested that a page presenting a group of media content items be updated, and/or based on any other suitable information.

Process 500 can identify additional candidate media content items at 508. As described above in connection with block 408 of FIG. 4, the additional candidate media content items can be identified from any suitable sources, such as forums of a social networking site, by identifying media content related to a particular media content item (e.g., a video that a user of the user device has indicated that they liked, and/or any other suitable media content), from a playlist of media content items, from media content identified as being popular within a particular genre, and/or any other suitable sources. In some embodiments, any suitable number (e.g., one, five, ten, fifty, and/or any other suitable number) of candidate media content items can be identified. Note that, in some embodiments, the identified additional candidate media content items can be considered in conjunction with the existing collection of media content items identified at block 501 in creation of the ranked subset of media content items presented on the user device, as described below in connection with block 512. For example, in some embodiments, process 500 can combine content items included in the collection of media content items identified at block 501 with the additional candidate media content items identified at block 508.

As a more particular example, in some embodiments, process 500 can import media content items included in one or more playlists. A specific example for creating a group of playlists is: "Playlists=['playlist_1', 'playlist_2', 'playlist_3']", where "Playlists" is an identifier for a group of three playlists. Note that, in some embodiments, any suitable number (e.g., one, two, five, ten, twenty, and/or any other suitable number) of playlists can be included in the group, and the individual playlists can be identified in any suitable manner. Process 500 can then identify the individual media content items included in each playlist to create a group of all of the media content items from all of the playlists. As a more particular example, process 500 can iterate over all of the media content items in each playlist and iterate over all of the individual playlists in the group of playlists to create a group of all of the media content items included in all of the playlists. Continuing from the previous specific example, the media content items from all of the playlists can be identified using:

"for Playlists in Playlists:
PlaylistItems=playlist_importer(getPlaylist(Playlists))
allVideos=allVideos+playlistItems"

where "playlist_importer(getPlaylist(Playlists))" is a function identifies items in a playlist that is imported from a library of functions.

Process 500 can create a ranked subset of the group of candidate media content items by applying the filtering criteria at 510. In some embodiments, applying the filtering criteria to the group of media content items can cause media content items to be removed from the group. For example, in some embodiments, the filtering criteria can indicate a time period associated with the media content items, and media content items created outside of the indicated time period are to be removed. As a more particular example, in some embodiments, the filtering criteria can indicate a date and/or time, and media content items created prior to the indicated date and/or time can be removed from the group of media content items. As another example, in some embodiments, the filtering criteria can indicate one or more keywords, and media content items that are not associated with the indicated keywords can be removed from the group of media content items. In some embodiments, media content items can be determined to be associated with particular keywords using any suitable information, such as metadata associated with the media content item, names of creators associated with the media content item, a title of the media content item, topics and/or genres associated with the media content item, and/or any other suitable information. As yet another example, in some embodiments, the filtering criteria can indicate that media content items that appear multiple times in the group of media content items are to be removed such that the media content item appears only once in the group. As still another example, in some embodiments, the filtering criteria can indicate that media content items that have already been presented on the user device and/or on a user device on which a user account associated with the user device has been authenticated are to be removed from the group of media content items. As still another example, in some embodiments, the filtering criteria can indicate that media content items that are longer or shorter than a particular duration are to be removed from the group of media content items.

Note that, the filtering criteria can be applied in any suitable combination(s) and in any suitable order. Continuing from the previous specific example, the group of media content items can be filtered to remove duplicate media content items by:

"allVideos=playlist_items_toolkit.removeDuplicates(all-Videos)"

where "playlist_items_toolkit.removeDuplicates(all-Videos)" is a function that removes duplicate items and that is imported from a library of functions. The filtering criteria can then be applied to remove media content items that are longer than a particular duration of time. Continuing the specific example, media content items longer than seven minutes can be removed using:

"sevenMinutes=60*7
allVideos=playlist_items_toolkit.filterOutVideosLongerThanSeconds(all Videos, sevenMinutes)"

where "playlist_items_toolkit.filterOutVideosLongerThanSeconds(all Videos, sevenMinutes)" is a function that removes media content items of a duration longer than a specified duration from a group of media content items and that is imported from a library of functions. The filtering criteria can then be applied to remove media content items that are not associated with particular keywords. Continuing the specific example, media content items not associated with the keyword "tutorial" can be removed by:

"keywords=['tutorial']
allVideos=playlist_items_toolkit.filterOutKeywords(all-Videos, keywords)"

where "playlist_items_toolkit,filterOutKeywords(allVideos, keywords)" is a function that removes media content items not associated with specified keywords and that is imported from a library of functions. Note that, in some embodiments, any of the specific examples described herein can be omitted, the specific examples can be implemented in any suitable order, and any other suitable filtering criteria can be used to further filter the group of media content items.

In some embodiments, the filtering criteria can be used to rank the group of media content items. For example, in some embodiments, the filtering criteria can indicate that media content items are to be ranked based on how recently each media content item was created. As a more particular example, in some embodiments, media content items that were created more recently can be ranked higher than media content items that were created earlier. As another example, media content items that are more closely related to a particular topic and/or keyword indicated in the filtering criteria can be ranked higher than other media content items. In some such embodiments, a relevance of a media content item to a particular topic and/or keyword can be determined in any suitable manner using any suitable information (e.g., metadata associated with the media content item, and/or any other suitable information).

Note that, in some embodiments, filtering criteria can be used to remove items from the group of media content items and/or to rank the media content items in any suitable combination. Additionally or alternatively, in some embodiments, the filtering criteria can be used to rank the group of media content items without removing any media content items. Furthermore, in some embodiments, the filtering criteria can indicate that the group of media content items are to be sorted using a random shuffle.

Process 500 can create a ranked subset of the group of candidate media content items using the filtering criteria. For example, in some embodiments, after ranking or ordering the media content items in any suitable manner as described above, process 500 can select the top N (e.g., the top five, the top ten, and/or any other suitable number) media content items. Note that, in some embodiments, the ranked subset can include all of the media content items in the group of media content items.

Process 500 can cause a user interface indicating the ranked subset of the group of candidate media content items to be presented on the user device at 512. For example, in some embodiments, the user interface can include the ranked subset of media content items as well as a title indicating a name of the group of media content items, as shown in and described above in connection with FIG. 1. Note that, in some embodiments, the title can be specified by a user of the user device. Additionally or alternatively, in some embodiments, process 500 can generate the title using any suitable information and technique(s). For example, in some embodiments, process 500 can generate the title based on metadata indicating a common topic and/or genre of the media content included in the ranked subset of the group of candidate media content items (e.g., that the content tends to relate to a particular topic, that the content tends to be created by a particular entity, and/or any other suitable common topic or genre).

Note that, in some embodiments, process 500 can cause the ranked subset of the group of candidate media content items to be presented on any suitable user device (e.g., a user device other than the user device that indicated the filtering criteria). For example, in some embodiments, the group of media content items can be aggregated and ranked using the filtering criteria indicated by a first user device, and the ranked group of media content items can be presented in a user interface on a second user device. In some embodiments, a first user of the first user device can be connected to a second user of the second user device (e.g., connected on a social networking service, associated with one or more of the same groups in a social networking service, and/or connected in any other suitable manner). Additionally or alternatively, in some embodiments, filtering criteria can be received from multiple user devices and can be used to collaboratively create the ranked subset of the group of candidate media content items. In some such embodiments, the ranked subset of the group of candidate media content items can be presented in user interface on user devices that did not indicate filtering criteria.

Process 500 can loop back to block 506 and can wait to receive another request to present a group of media content items. Note that, in some embodiments, the second request to present a group of media content items can be a request to update a group of media content items that was previously presented at block 512. In some such embodiments, the group of media content items can be identified and ranked using the filtering criteria received at block 502. Additionally or alternatively, in some embodiments, the second request to present a group of media content items can be a request to present a different and/or unrelated group of media content items. In some such embodiments, the group of media content items can be identified and ranked using different filtering criteria than the filtering criteria received at block 502. For example, in some embodiments, the different filtering criteria can be associated with the user device and/or a user account that has been authenticated on the user device and with an identifier of a different group of media content items to be presented (e.g., a different topic, a different genre, and/or any other suitable type of group).

In some embodiments, at least some of the above described blocks of the processes of FIGS. 4 and 5 can be executed or performed in any order or sequence not limited to the order and sequence shown in and described in connection with the figures. Also, some of the above blocks of FIGS. 4 and 5 can be executed or performed substantially simultaneously where appropriate or in parallel to reduce latency and processing times. Additionally or alternatively, some of the above described blocks of the processes of FIGS. 4 and 5 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personal information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for creating and updating a group of media content items are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for identifying and updating a group of media content items, comprising:
receiving, using a hardware processor, from a user device, one or more indications of filtering criteria to be applied to a corpus of media content items;
storing, using the hardware processor, the received indications of filtering criteria in connection with an identifier of a collection of media content items;
receiving, using the hardware processor, from the user device, a first request to present the collection of media content items;
in response to receiving the first request, generating, using the hardware processor, a filtering function based on the filtering criteria that is associated with the first request received from the user device and that iteratively identifies media content items from a plurality of playlists of media content items;
applying, using the hardware processor, the filtering function to identify a first collection of media content items, wherein the first collection of media content items includes a plurality of media content items associated with a particular topic;
identifying, using the hardware processor, a first group of candidate media content items, wherein the first group of candidate media content items includes media content items not included in the first collection of media content items;
creating, using the hardware processor, a second collection of media content items by applying the stored filtering criteria to the first collection of media content items and the first group of candidate media content items;
causing, using the hardware processor, a user interface that indicates the second collection of media content items and the identifier of the collection of media content items to be presented on the user device;
receiving, using the hardware processor, from the user device, a second request to update the second collection of media content items;
in response to receiving the second request, applying, using the hardware processor, the filtering function to identify a second group of candidate media content items from the one or more sources of media content;
modifying, using the hardware processor, the second collection of media content items by applying the stored filtering criteria to the second group of candidate media content items;
updating, using the hardware processor, the user interface by indicating the modified second collection of media content items; and
causing, using the hardware processor, the updated user interface to be presented on the user device.

2. The method of claim 1, wherein the filtering criteria include one or more keywords indicating a topic of the media content in the group of media content items.

3. The method of claim 1, wherein the filtering criteria include an indication that the second collection of media content items are to be ranked based on a time at which each media content item in the first collection of candidate media content items and the first group of candidate media content items was created.

4. The method of claim 1, wherein creating the second collection of media content items comprises:
identifying a media content item that is included a plurality of times in the first group of candidate media content items; and
removing duplicate versions of the media content item from the first group of candidate media content items.

5. The method of claim 1, wherein creating the second collection of media content items comprises:
  identifying a media content item that has previously been presented on the user device; and
  removing the media content item from the first group of candidate media content items.

6. The method of claim 1, wherein the filtering criteria include an indication of a time period after which the group of media content items is to be updated, wherein the second group of candidate media content items is identified in response to determining that the time period has elapsed.

7. The method of claim 1, wherein updating the user interface further comprises presenting an indication of a time at which the second collection of media content items was modified.

8. A system for identifying and updating a group of media content items, the system comprising:
  a hardware processor that is programmed to:
    receive, from a user device, one or more indications of filtering criteria to be applied to a corpus of media content items;
    store the received indications of filtering criteria in connection with an identifier of a collection of media content items;
    receive, from the user device, a first request to present the collection of media content items;
    in response to receiving the first request, generate a filtering function based on the filtering criteria that is associated with the first request received from the user device and that iteratively identifies media content items from a plurality of playlists of media content items;
    apply the filtering function to identify a first collection of media content items, wherein the first collection of media content items includes a plurality of media content items associated with a particular topic;
    identify a first group of candidate media content items, wherein the first group of candidate media content items includes media content items not included in the first collection of media content items;
    create a second collection of media content items by applying the stored filtering criteria to the first collection of media content items and the first group of candidate media content items;
    cause a user interface that indicates the second collection of media content items and the identifier of the collection of media content items to be presented on the user device;
    receive, from the user device, a second request to update the second collection of media content items;
    in response to receiving the second request, applying the filtering function to identify a second group of candidate media content items from the one or more sources of media content;
    modify the second collection of media content items by applying the stored filtering criteria to the second group of candidate media content items;
    update the user interface by indicating the modified second collection of media content items; and
    cause the updated user interface to be presented on the user device.

9. The system of claim 8, wherein the filtering criteria include one or more keywords indicating a topic of the media content in the group of media content items.

10. The system of claim 8, wherein the filtering criteria include an indication that the second collection of media content items are to be ranked based on a time at which each media content item in the first collection of candidate media content items and the first group of candidate media content items was created.

11. The system of claim 8, wherein the hardware processor is further programmed to:
  identify a media content item that is included a plurality of times in the first group of candidate media content items; and
  remove duplicate versions of the media content item from the first group of candidate media content items.

12. The system of claim 8, wherein the hardware processor is further programmed to:
  identify a media content item that has previously been presented on the user device; and
  remove the media content item from the first group of candidate media content items.

13. The system of claim 8, wherein the filtering criteria include an indication of a time period after which the group of media content items is to be updated, wherein the second group of candidate media content items is identified in response to determining that the time period has elapsed.

14. The system of claim 8, wherein the hardware processor is further programmed to present an indication of a time at which the second collection of media content items was modified.

15. A non-transitory computer-readable medium containing computer executable instructions that, when executed by a processor, cause the processor to perform a method for identifying and updating a group of media content items, the method comprising:
  receiving, from a user device, one or more indications of filtering criteria to be applied to a corpus of media content items;
  storing the received indications of filtering criteria in connection with an identifier of a collection of media content items;
  receiving, from the user device, a first request to present the collection of media content items;
  in response to receiving the first request, generating a filtering function based on the filtering criteria that is associated with the first request received from the user device and that iteratively identifies media content items from a plurality of playlists of media content items;
  applying the filtering function to identify a first collection of media content items, wherein the first collection of media content items includes a plurality of media content items associated with a particular topic;
  identifying a first group of candidate media content items, wherein the first group of candidate media content items includes media content items not included in the first collection of media content items;
  creating a second collection of media content items by applying the stored filtering criteria to the first collection of media content items and the first group of candidate media content items;
  causing a user interface that indicates the second collection of media content items and the identifier of the collection of media content items to be presented on the user device;
  receiving, from the user device, a second request to update the second collection of media content items;
  in response to receiving the second request, applying the filtering function to identify a second group of candidate media content items from the one or more sources of media content;

modifying the second collection of media content items by applying the stored filtering criteria to the second group of candidate media content items;

updating the user interface by indicating the modified second collection of media content items; and causing the updated user interface to be presented on the user device.

16. The non-transitory computer-readable medium of claim 15, wherein the filtering criteria include one or more keywords indicating a topic of the media content in the group of media content items.

17. The non-transitory computer-readable medium of claim 15, wherein the filtering criteria include an indication that the second collection of media content items are to be ranked based on a time at which each media content item in the first collection of candidate media content items and the first group of candidate media content items was created.

18. The non-transitory computer-readable medium of claim 15, wherein creating the second collection of media content items comprises:

identifying a media content item that is included a plurality of times in the first group of candidate media content items; and removing duplicate versions of the media content item from the first group of candidate media content items.

19. The non-transitory computer-readable medium of claim 15, wherein creating the second collection of media content items comprises:

identifying a media content item that has previously been presented on the user device; and removing the media content item from the first group of candidate media content items.

20. The non-transitory computer-readable medium of claim 15, wherein the filtering criteria include an indication of a time period after which the group of media content items is to be updated, wherein the second group of candidate media content items is identified in response to determining that the time period has elapsed.

21. The non-transitory computer-readable medium of claim 15, wherein updating the user interface further comprises presenting an indication of a time at which the second collection of media content items was modified.

* * * * *